US012525171B2

(12) United States Patent
Kang

(10) Patent No.: US 12,525,171 B2
(45) Date of Patent: Jan. 13, 2026

(54) DISPLAY DEVICE FOR HIGH-SPEED DRIVING

(71) Applicant: LG Display Co., Ltd., Seoul (KR)

(72) Inventor: Jeong Ho Kang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/763,179

(22) Filed: Jul. 3, 2024

(65) Prior Publication Data

US 2025/0078724 A1 Mar. 6, 2025

(30) Foreign Application Priority Data

Sep. 5, 2023 (KR) ........................ 10-2023-0117534

(51) Int. Cl.
*G09G 3/20* (2006.01)

(52) U.S. Cl.
CPC ... *G09G 3/2096* (2013.01); *G09G 2310/0291* (2013.01); *G09G 2310/08* (2013.01); *G09G 2330/021* (2013.01)

(58) Field of Classification Search
CPC ......... G09G 3/2096; G09G 2310/0291; G09G 2310/08; G09G 2330/021; G09G 3/30; G09G 3/32; G09G 3/3696; G09G 3/3685; G09G 2310/027
See application file for complete search history.

(56) References Cited

U.S. PATENT DOCUMENTS 6,194,935 B1 * 2/2001 Pioppo ................ H03K 17/163 327/134
10,444,881 B2 * 10/2019 Jang .................... G06F 3/04184
2004/0036670 A1 * 2/2004 Chung ................. G09G 3/3688 345/99
2005/0040889 A1 * 2/2005 Tsuchi .................... H03F 3/303 330/255
2007/0241817 A1 * 10/2007 Yokota ................ H03F 3/45475 330/255
2022/0122542 A1 * 4/2022 Kim ..................... G09G 3/3266
2022/0415279 A1 * 12/2022 Kang .................... G09G 3/3688
2023/0113898 A1 * 4/2023 Kim ..................... G09G 3/2092 345/211

FOREIGN PATENT DOCUMENTS

EP 1469603 B1 * 3/2010 ....... H03K 19/00361
KR 20180042511 A * 4/2018 ........... G09G 3/3614

* cited by examiner

*Primary Examiner* — Temesghen Ghebretinsae
*Assistant Examiner* — Karin Kiyabu
(74) *Attorney, Agent, or Firm* — Fenwick & West LLP

(57) ABSTRACT

A display apparatus includes a display panel including pixels, a timing controller configured to generate current mirror control information, based on an amount of transition of image data to be written in the pixels, and an output circuit configured to output a target data voltage, corresponding to the image data, to a data output channel connected to one of the pixels, wherein the output circuit includes a mirroring current generator configured to generate a mirroring current and an amplifier circuit including a pull-up transistor including a gate electrode connected to a first control node, a first current mirror configured to supply the mirroring current to the first control node according to the current mirror control information, a pull-down transistor including a gate electrode connected to a second control node, and a second current mirror configured to supply the mirroring current to the second control node.

12 Claims, 19 Drawing Sheets

| | Iadd |
|---|---|
| ISEL=LL | Iref1(=Iref) |
| ISEL=LH | Iref2(=2xIref) |
| ISEL=HL | Iref3(=3xIref) |
| ISEL=HH | Iref4(=4xIref) |

| CTR_1 | Current Mirror Selection | |
|---|---|---|
| '01' or '1' | CM2 = 'On' | CM1 = 'Off' |
| '10' or '0' | CM1 = 'On' | CM2 = 'Off' |

| CTR_2 | Current Mirror Selection | Data Transition |
|---|---|---|
| '00' | 'Off' | $\Delta \leq V_{TH}1$ |
| '01' | '100%' | $V_{TH}1 < \Delta \leq V_{TH}2$ |
| '10' | '120%' | $V_{TH}2 < \Delta \leq V_{TH}3$ |
| '11' | '150%' | $\Delta > V_{TH}3$ |

DISPLAY DEVICE FOR HIGH-SPEED DRIVING

CROSS-REFERENCE TO RELATED APPLICATION

This application claims the benefit of the Republic of Korea Patent Application No. 10-2023-0117534 filed on Sep. 5, 2023, which is hereby incorporated by reference in its entirety.

BACKGROUND

Field of Technology

The present disclosure relates to a high-speed driving display apparatus.

Discussion of the Related Art

Recently, display apparatuses including a high-performance source driver integrated circuit (IC) have been developed to be suitable for high-speed driving. The display apparatuses have increased the output performance of an output circuit included in a source driver IC to increase an output slew rate of a target data voltage which is to be written in a display panel.

However, because a level of a main bias current supplied to an output circuit should increase for increasing an output slew rate, there is a problem where power consumption increases. A power consumption characteristic and a data charging/discharging characteristic (i.e., an output slew rate) needed for high-speed driving display apparatuses have a trade-off relationship therebetween. In high-speed driving display apparatuses of the related art, it is difficult to satisfy all of a power consumption characteristic and a data charging/discharging characteristic.

SUMMARY

To overcome the aforementioned problem of the related art, the present disclosure may provide a display apparatus which may decrease power consumption and may enhance an output slew rate even without an increase in a main bias current supplied to an output circuit.

To achieve these objects and other advantages and in accordance with the purpose of the disclosure, as embodied and broadly described herein, a display apparatus includes a display panel including a plurality of pixels, a timing controller configured to generate current mirror control information, based on an amount of transition of image data to be written in the plurality of pixels, and an output circuit configured to output a target data voltage, corresponding to the image data, to a data output channel connected to one of the plurality of pixels, wherein the output circuit includes a mirroring current generator configured to generate a mirroring current and an amplifier circuit including a pull-up transistor including a gate electrode connected to a first control node, a first current mirror configured to supply the mirroring current to the first control node according to the current mirror control information, a pull-down transistor including a gate electrode connected to a second control node, and a second current mirror configured to supply the mirroring current to the second control node according to the current mirror control information.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
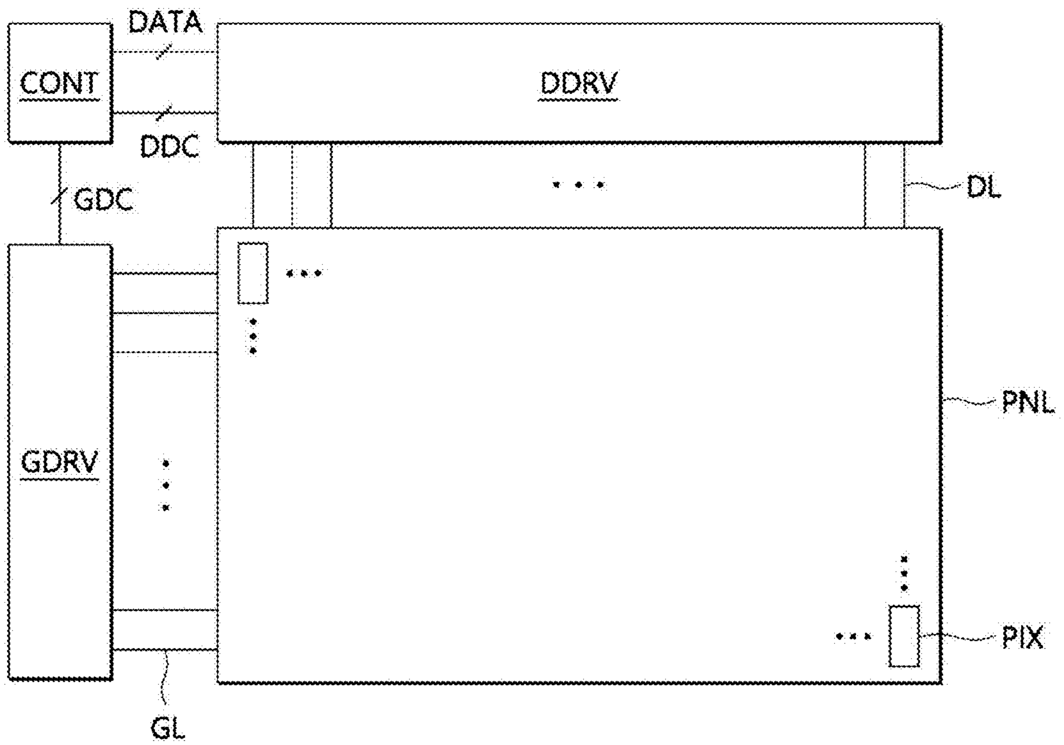
FIG. 1 is a diagram illustrating a display apparatus according to one embodiment.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms “comprise”, “having,” “including” and the like suggest that other parts can be added unless the term “only” is used. As used herein, the singular forms “a”, “an”, and “the” are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as “on~”, “over~”, “under~”, and “next~”, one or more other parts may be disposed between the two parts unless “just” or “direct” is used.

It will be understood that, although the terms “first”, “second”, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 2:
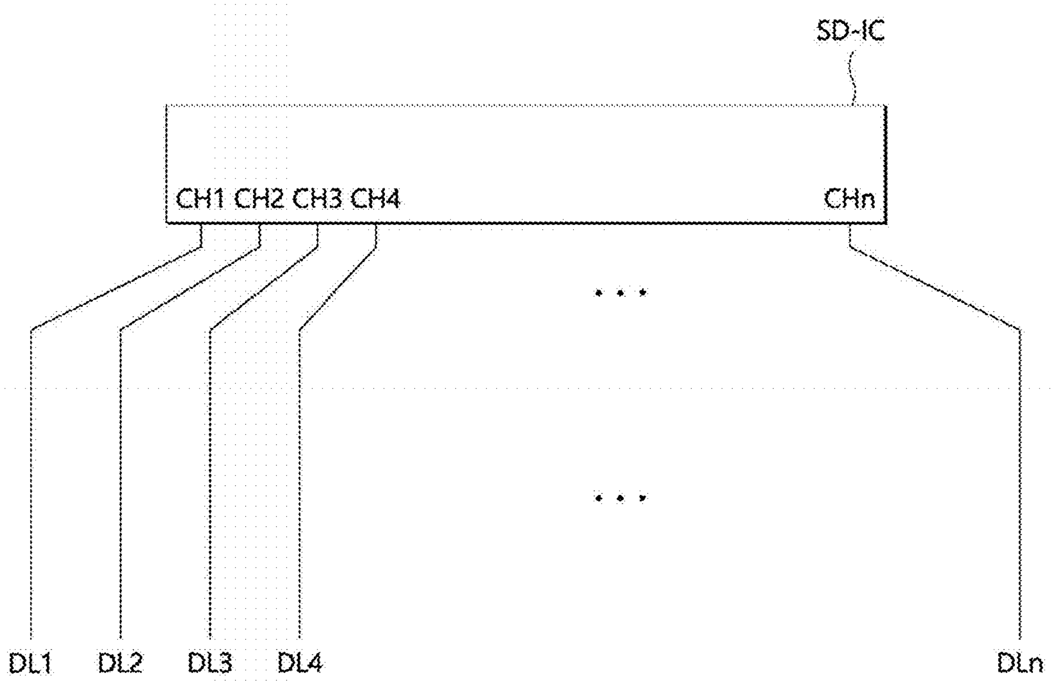
FIG. 2 is a diagram illustrating a connection relationship between a source driver integrated circuit (IC) and data lines in a display apparatus according to one embodiment.

FIG. 1 is a diagram illustrating a display apparatus according to one embodiment. FIG. 2 is a diagram illustrating a connection relationship between a source driver integrated circuit (IC) and data lines in a display apparatus according to one embodiment.

Referring to FIGS. 1 and 2, the display apparatus according to the present embodiment may include a display panel PNL, a timing controller CONT, a data driver circuit DDRV, and a gate driver circuit GDRV.

A plurality of data lines DL and a plurality of gate lines GL may be provided in the display panel PNL, and a plurality of pixels PIX may be respectively arranged in a plurality of intersection areas between the signal lines GL and DL. A pixel array may be provided in a display area of the display panel PNL by using the pixels PIX arranged as a matrix type.

In the pixel array, the pixels PIX may configure a horizontal line in a horizontal direction so as to be adjacent. The number of horizontal lines may be a vertical resolution of the display panel PNL. Pixels PIX configuring the same horizontal line may be connected to the same gate line GL and different data lines DL, but are not limited thereto. Each of the pixels PIX may be implemented as an emission cell including a light emitting diode or a liquid crystal cell including a liquid crystal layer, but the present embodiment is not limited thereto.

The timing controller CONT may generate a data timing control signal DDC for controlling an operation timing of the data driver circuit DDRV and a gate timing control signal GDC for controlling an operation timing of the gate driver circuit GDRV, based on timing signals such as a vertical synchronization signal Vsync, a horizontal synchronization signal Hsync, and a data enable signal DE input from a host system (not shown). The gate timing control signal GDC may include a gate start signal and gate shift clocks. The data timing control signal DDC may include a source start pulse, a source sampling clock, and a source output enable signal.

The timing controller CONT may transfer image data DATA, input from the host system, to the data driver circuit DDRV through an internal interface circuit. The image data DATA may be for displaying an image by using the pixels PIX, and the data driver circuit DDRV may convert the image data DATA into data voltages respectively corresponding to gray levels and may write the data voltages in the pixels PIX. The internal interface circuit for data communication between the timing controller CONT and the data driver circuit DDRV may be an embedded panel interface (EPI) circuit.

The timing controller CONT may compare image data DATA of a previous horizontal line with image data DATA of a current horizontal line to calculate the degree of transition of the image data DATA by pixel units, and then, may generate current mirror control information, based on the degree of transition of the image data DATA. The timing controller CONT may encode the data timing control signal DDC, the current mirror control information, and the image data DATA in an EPI transfer format and may transfer the encoded timing control signal DDC, current mirror control information, and image data DATA to the data driver circuit DDRV through the internal interface circuit.

The gate driver circuit GDRV may generate a scan signal, based on the gate timing control signal GDC from the timing controller CONT, and may supply the scan signal to the gate lines GL. A horizontal line in which a data voltage is to be written may be selected by the scan signal. The gate driver circuit GDRV may be embedded into a non-display area of the display panel PNL, based on a gate in panel (GIP) type. The non-display area may be disposed outside the panel array in the display panel PNL.

The data driver circuit DDRV may include at least one source driver integrated circuit (IC) SD-IC. The source driver IC SD-IC may decode the EPI transfer format transferred from the timing controller CONT to separate the data timing control signal DDC, the current mirror control information, and the image data DATA from the EPI transfer format. The source driver IC SD-IC may convert the image data DATA into data voltages, based on the data timing control signal DDC, and may output the data voltages to the data lines DL1 to DLn through data output channels CH1 to CHn.

At this time, the source driver IC SD-IC may selectively improve an output slew rate of each of the data voltages, based on the current mirror control information, thereby enhancing all of a power consumption characteristic and a data charging/discharging characteristic.

Figure 3:
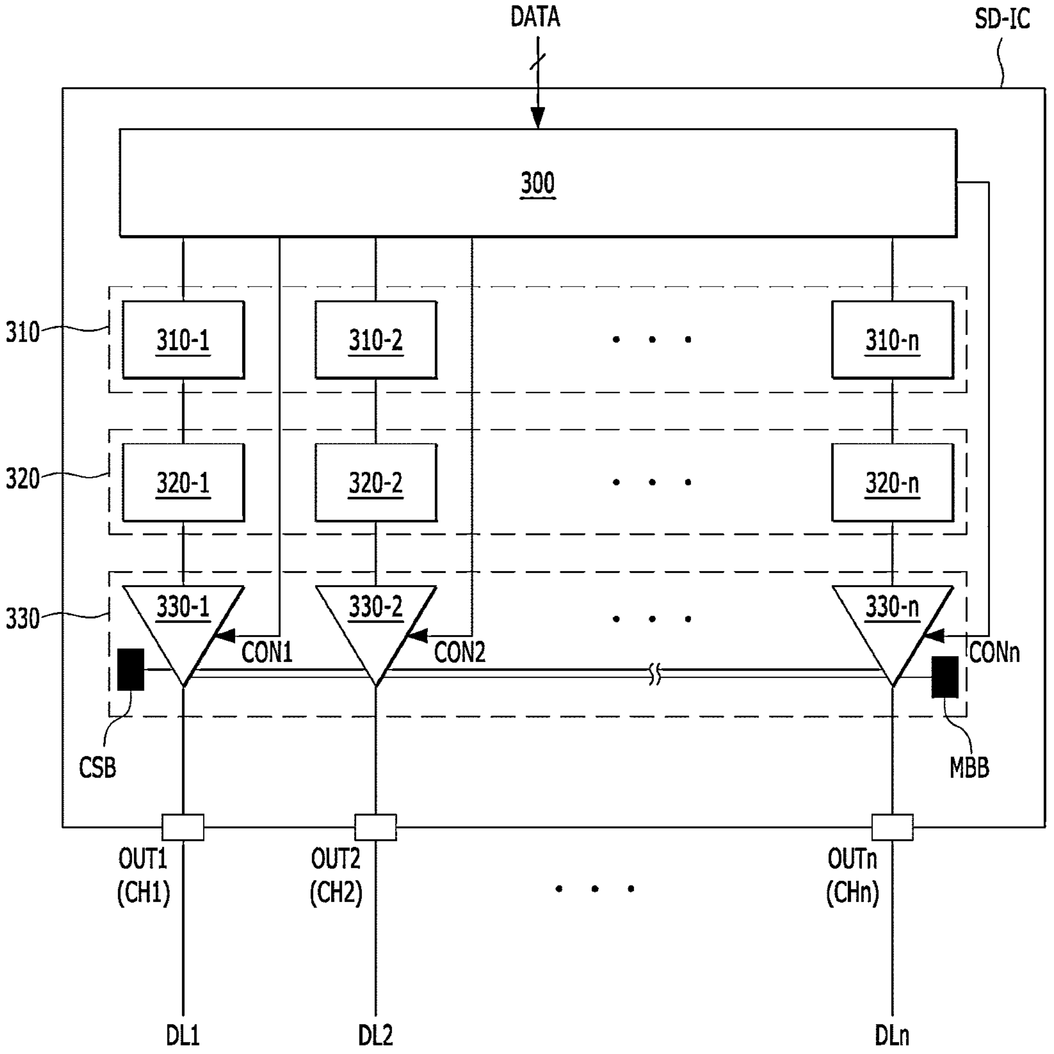
FIG. 3 is a diagram illustrating a source driver IC in a display apparatus according to one embodiment.

FIG. 3 is a diagram illustrating a source driver IC in a display apparatus according to one embodiment.

Referring to FIG. 3, the source driver IC SD-IC may include a control logic 300, a latch circuit 310, a digital-to-analog (D/A) conversion circuit 320, and an output circuit 330.

The control logic circuit 300 may sample RGB image data included in an EPI transfer format of a serial type to recover, based on an internal clock timing. The control logic circuit 300 may sample a bit of control packet data included in the EPI transfer format, based on an internal clock timing, and may sample the data timing control signal DDC and current mirror control information CON1 to CONn, which are for controlling an operation of the source driver IC SD-IC, from the sampled control packet data to recover, based on the internal clock timing.

The current mirror control information CON1 to CONn may be independently set and recovered at a period of one horizontal period for each data output channel. The current mirror control information CON1 to CONn may include transition direction information (i.e., first control information) for selectively turning on a first current mirror or a second current mirror in the output circuit 330 and on time information (i.e., second control information) for setting a time for maintaining a selected current mirror in an enable state.

The transition direction information may denote a transition direction of a data voltage and may include a first logic value (or a first bit value) indicating up transition and a second logic value (or a second bit value) indicating down transition. The transition direction information may be based on the amount of pixel-based data transition of each output channel obtained by comparing $N^{th}-1$ (where N may be a natural number) horizontal line image data with $N^{th}$ horizontal line image data. Based on a positive (+) sign or a negative (−) sign of data transition, the second current mirror may be turned on, or the first current mirror may be turned on. That is, the transition direction information may be a criterion which selects a current mirror enabled among the first and second current mirrors in the output circuit 330.

When the first logic value indicating up transition is input to the output circuit 330, the second current mirror may be enabled, and a gate on voltage of a pull-up transistor may be bootstrapped, and thus, an up transition time of a data voltage may be reduced.

When the second logic value indicating down transition is input to the output circuit 330, the first current mirror may be enabled, and a gate on voltage of a pull-down transistor may be bootstrapped, and thus, a down transition time of the data voltage may be reduced.

The on time information may be a criterion for setting an enable maintenance time of a current mirror selected based on the transition direction information. The on time information may be set so that an enable maintenance time of a current mirror increases as the amount of transition of a data voltage increases. For example, when the first logic value indicating up transition is input to the output circuit 330, the second current mirror may be enabled, and an enable maintenance time of the second current mirror may be determined based on the on time information. As the amount of up transition of a data voltage increases, the enable maintenance time of the second current mirror may increase, and thus, an up transition time may decrease. In this manner, when the second logic value indicating down transition is input to the output circuit 330, the first current mirror may be enabled, and an enable maintenance time of the first current mirror may be determined based on the on time information. As the amount of down transition of the data voltage increases, the enable maintenance time of the first current mirror may increase, and thus, a down transition time may decrease. Also, when the amount of transition of the data voltage is less than or equal to a predetermined threshold value, the on time information may be set to disable all of the first and second current mirrors.

The latch circuit 310 may convert bits of RGB image data, sampled by the control logic circuit 300, into a parallel-type data format. The latch circuit 310 may be synchronized based on an internal clock output from the control logic circuit 300.

The D/A conversion circuit 320 may map RGB image data, converted into the parallel-type data format, to gamma compensation voltages output by a gamma circuit to generate a target data voltage. The gamma circuit may include at least one gamma resistor string for divide a high level gamma voltage and a low level gamma voltage and a plurality of gamma buffers which output, as gamma compensation voltages, voltages applied to voltage division nodes of the gamma resistor string.

The D/A conversion circuit 320 may include a plurality of DAC switches which are individually coupled to output buffers 330-1 to **330-*n* of the output circuit 330. Each of the DAC switches may selectively supply a gamma compensation voltage, mapped to each gray level of the RGB image data, as a target data voltage to the output circuit 330**.

The output circuit 330 may include a plurality of output buffers 330-1 to **330-*n* and may output the target data voltage, corresponding to the RGB image data, to the data output channels CH1 to CHn. An output slew rate of an amplifier circuit included in each of the plurality of output buffers 330-1 to 330-*n* may be individually controlled based on the current mirror control information CON1 to CONn input from the control logic circuit 300**.

The output circuit 330 may include a main bias unit MBB (e.g., a circuit) and a mirroring current generator CSB, which are connected to the output buffers 330-1 to **330-*n*** in common.

The main bias unit MBB may apply an amplifier bias current, needed for an operation of each output buffer, to the output buffers 330-1 to **330-*n* in common. The amplifier bias current may be set to a minimum level based on a normal transition condition, power consumption occurring in the output buffers 330-1 to 330-*n*** may be reduced.

The mirroring current generator CSB may generate a mirroring current for increasing an output slew rate of the amplifier circuit and may apply the mirroring current to the output buffers 330-1 to **330-*n*. The mirroring current generator CSB may adjust a level of the mirroring current, based on the current mirror control information CON1 to CONn input from the control logic circuit 300**.

Figure 4:
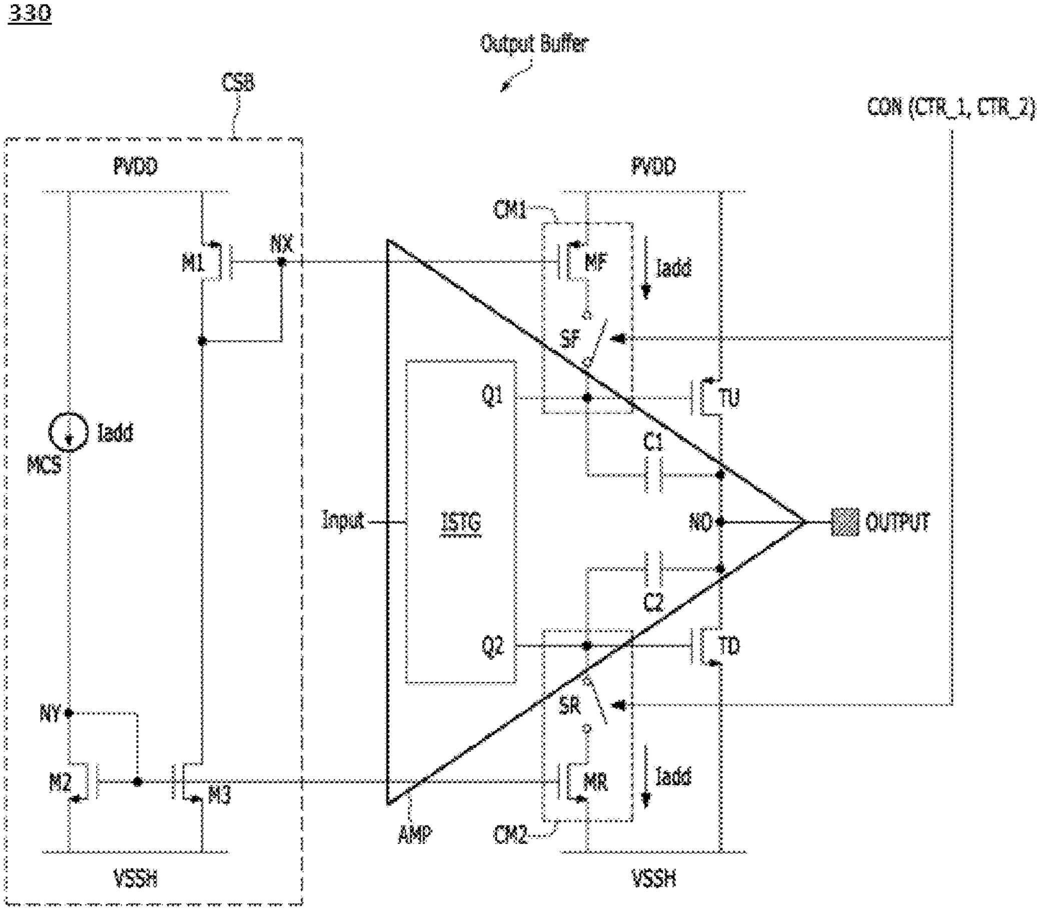
FIG. 4 is a diagram illustrating an example of an output circuit included in a source driver IC in a display apparatus according to one embodiment.
Figure 5:
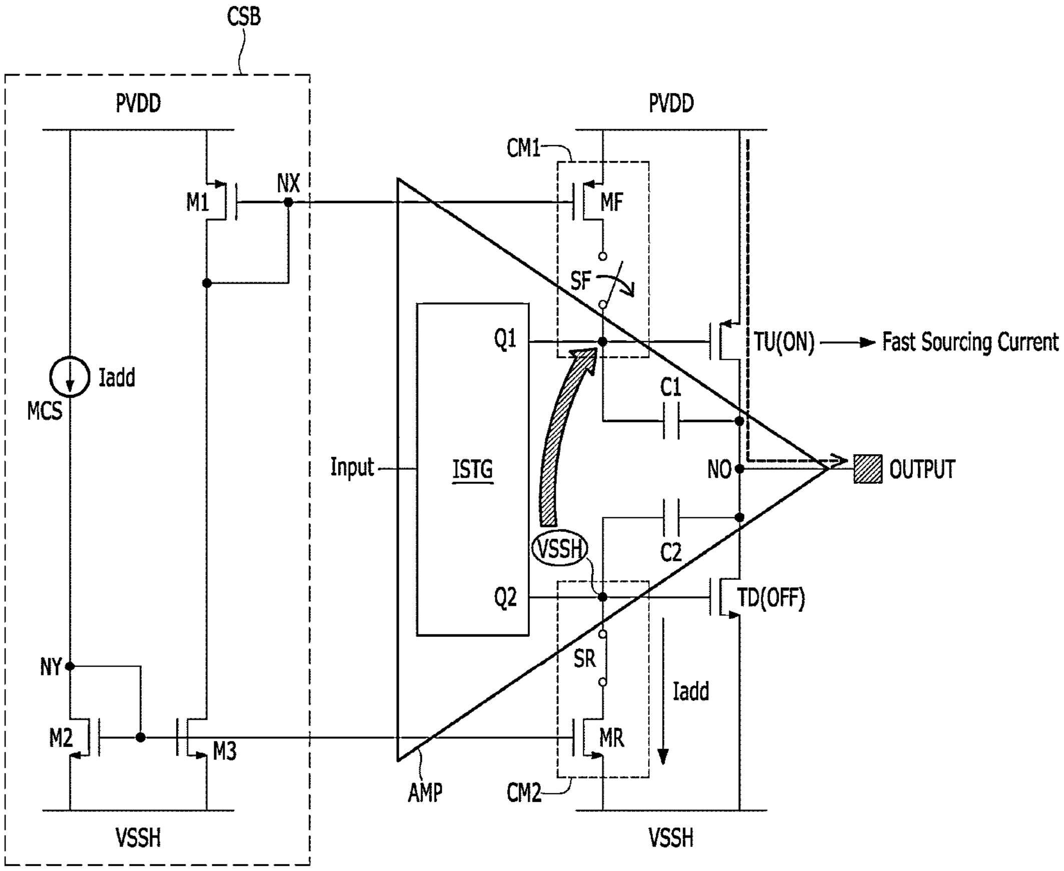
FIGS. 5 and 6 are diagrams illustrating an example where an up slew rate of an amplifier output is enhanced by a fast sourcing current generated in an on operation of a second current mirror according to one embodiment.
Figure 6:
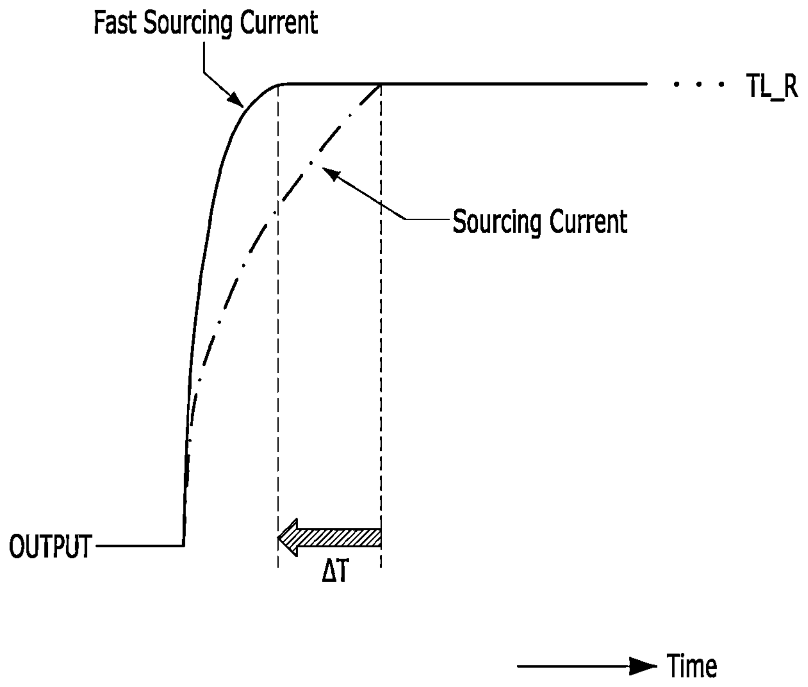
Figure 7:
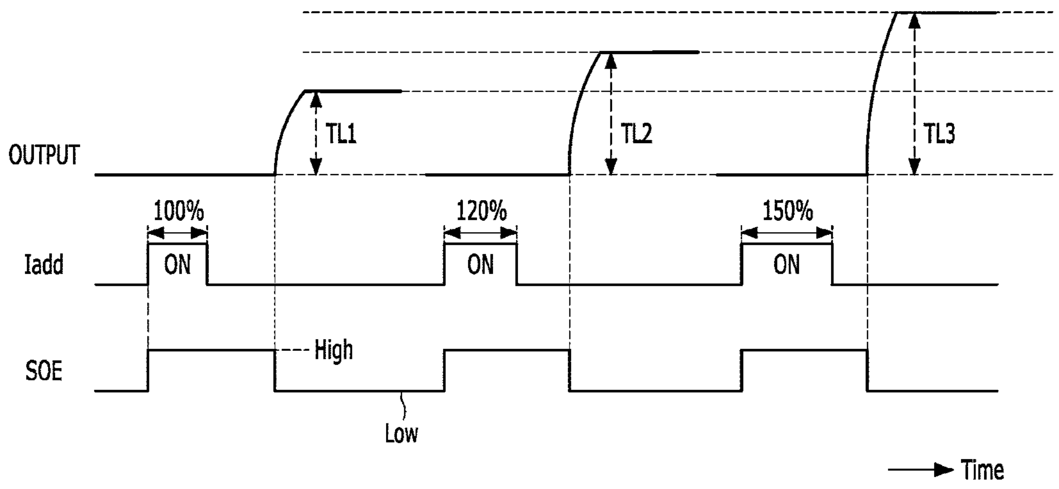
FIG. 7 is a diagram illustrating a variation of an amplifier output with respect to an on operation time of the second current mirror according to one embodiment.
Figure 8:
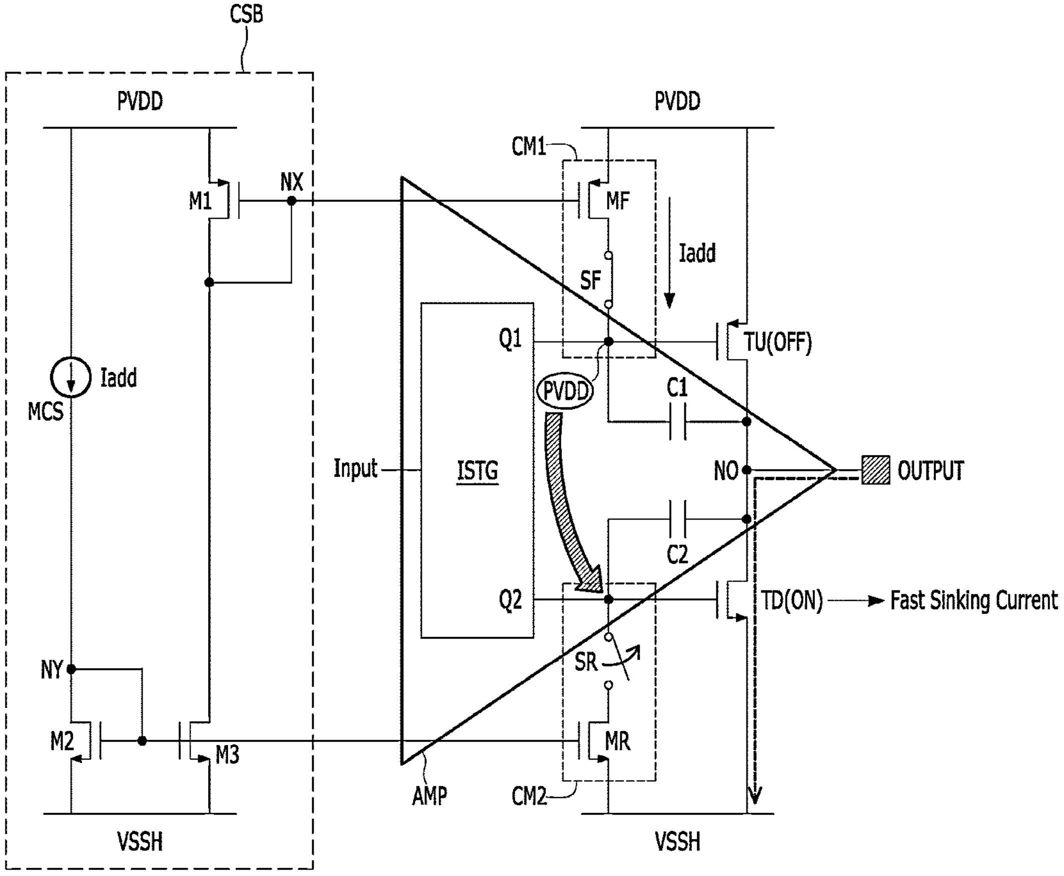
FIGS. 8 and 9 are diagrams illustrating an example where a down slew rate of an amplifier output is enhanced by a fast sinking current generated in an on operation of a first current mirror according to one embodiment.
Figure 9:
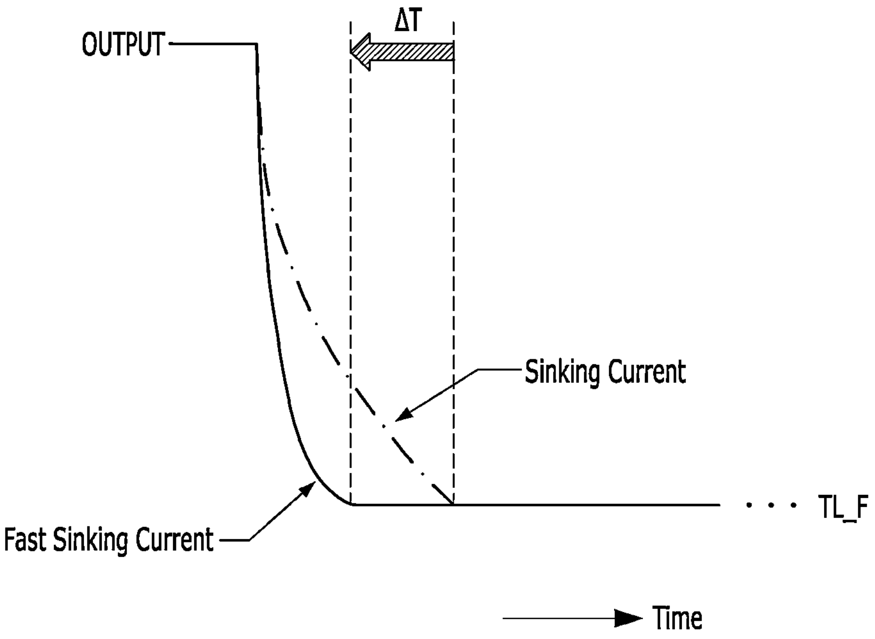
Figure 10:
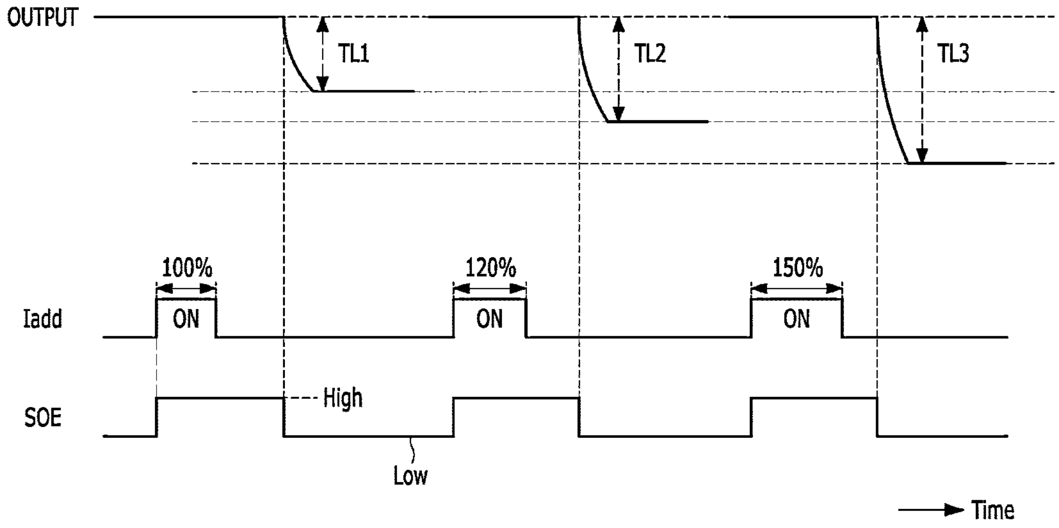
FIG. 10 is a diagram illustrating a variation of an amplifier output with respect to an on operation time of the first current mirror according to one embodiment.

FIG. 4 is a diagram illustrating an example of an output circuit included in a source driver IC in a display apparatus according to one embodiment. FIGS. 5 and 6 are diagrams illustrating an example where an up slew rate of an amplifier output is enhanced by a fast sourcing current generated in an on operation of a second current mirror according to one embodiment. FIG. 7 is a diagram illustrating a variation of an amplifier output with respect to an on operation time of the second current mirror according to one embodiment. FIGS. 8 and 9 are diagrams illustrating an example where a down slew rate of an amplifier output is enhanced by a fast sinking current generated in an on operation of a first current mirror according to one embodiment. FIG. 10 is a diagram illustrating a variation of an amplifier output with respect to an on operation time of the first current mirror according to one embodiment.

Referring to FIG. 4, an output circuit 330 according to the present embodiment may include a mirroring current generator CSB which generates a mirroring current Iadd and an output buffer which is connected to the mirroring current generator CSB. The output buffer may include an amplifier AMP including an amplifier circuit.

The amplifier circuit may be connected to an input stage ISTG of the amplifier AMP to which a target data voltage is input. The amplifier circuit may be connected a first control node Q1 and a second control node Q2 of the input stage ISTG and may be enabled with the mirroring current Iadd supplied to the first control node Q1 and the second control node Q2 to output the target data voltage to an output node NO.

The amplifier circuit may include a pull-up transistor TU including a gate electrode which is connected to the first control node Q1, a first current mirror CM1 which supplies the mirroring current Iadd to the first control node Q1 according to current mirror control information CON, a pull-down transistor TD including a gate electrode which is connected to the second control node Q2, and a second current mirror CM2 which supplies the mirroring current Iadd to the second control node Q2 according to the current mirror control information CON.

The pull-up transistor TU may be implemented as a P-type transistor (for example, PMOS) connected between a high level voltage source PVDD and an output node NO. The pull-down transistor TD may be implemented as an N-type transistor (for example, NMOS) connected between a low level voltage source VSSH and the output node NO.

The first current mirror CM1 may include a first mirror transistor MF and a first switch SF, which are serially connected between the high level voltage source PVDD and the first control node Q1. The first mirror transistor MF may be implemented as a P-type transistor (for example, PMOS) and may configure a current mirror along with a transistor M1 of the mirroring current generator CSB. To this end, a gate electrode of the first mirror transistor MF may be connected to a gate electrode of the transistor M1 through a node NX, and the same mirroring current Iadd may flow in the first mirror transistor MF and the transistor M1. The first switch SF may be enabled (for example, turned on) based on first control information CTR_1 (i.e., transition direction information) of the current mirror control information CON. An enable maintenance time of the first switch SW may be controlled based on second control information CTR_2 (i.e., on time information) of the current mirror control information CON.

The second current mirror CM2 may include a second mirror transistor MR and a second switch SR, which are serially connected between the low level voltage source VSSH and the second control node Q2. The second mirror transistor MR may be implemented as an N-type transistor (for example, NMOS) and may configure a current mirror along with a transistor M2 of the mirroring current generator CSB. To this end, a gate electrode of the second mirror transistor MR may be connected to a gate electrode of the transistor M2 through a node NY, and the same mirroring current Iadd may flow in the second mirror transistor MF and the transistor M2. The second switch SR may be enabled (for example, turned on) based on the first control information CTR_1 (i.e., transition direction information) of the current mirror control information CON. An enable maintenance time of the second switch SR may be controlled based on the second control information CTR_2 (i.e., on time information) of the current mirror control information CON.

The amplifier circuit may further include a first capacitor C1 connected between the first control node Q1 and the output node NO and a second capacitor C2 connected between the second control node Q2 and the output node NO. The first and second capacitors C1 and C2 may electrically couple the first control node Q1 to the second control node Q2 to allow gate voltages of the pull-up and pull-down transistors TU and TD to be bootstrapped based on a predetermined condition.

The mirroring current generator CSB may apply the same mirroring current Iadd to the first current mirror CM1 and the second current mirror CM2 and may thus prevent a problem of output asymmetry between a rising output and a falling output occurring when enhancing an output slew rate of the amplifier circuit.

The mirroring current generator CSB may include a current source MCS and transistors M1 to M3, which are connected to the high level voltage source PVDD generating the mirroring current Iadd. One electrode of the transistor M1 may be connected to the high level voltage source PVDD, and a gate electrode and a drain electrode of the transistor M1 may be connected to the node NX. The transistor M1 may be implemented as a PMOS transistor. One electrode of the transistor M2 may be connected to the low level voltage source VSSH, and a gate electrode and a drain electrode of the transistor M2 may be connected to the node NY. A gate electrode of the transistor M3 may be connected to the node NY, a drain electrode of the transistor M3 may be connected to the node NX, and a source electrode of the transistor M3 may be connected to the low level voltage source VSSH. Each of the transistors M2 and M3 may be implemented as an NMOS transistor.

As in FIG. 5, when the second current mirror CM2 is turned on (for example, the second switch SR is turned on) based on the first control information CTR_1 indicating up transition, the low level voltage source VSSH is coupled to the first and second control nodes Q1 and Q2, and thus, the pull-up transistor TU may be turned on and the pull-down transistor TD may be turned off. A gate on voltage of the pull-up transistor TU may be bootstrapped by the low level voltage source VSSH, as in FIG. 6, a fast sourcing current may flow through the pull-up transistor TU, and thus, an amplifier output OUTPUT may rise. Comparing with a normal sourcing current of when the gate on voltage of the pull-up transistor TU is not bootstrapped, as in FIG. 6, the fast sourcing current may advance, by ΔT, an up transition time at which the amplifier output OUTPUT is shifted to a target voltage level TL_R, and as a result, an output slew rate of the target data voltage may be enhanced.

In this case, as in FIG. 7, when a time for which the second current mirror CM2 is enabled (i.e., a time for which the second switch SR is turned on) increases based on the second control information CTR_2 of the current mirror control information CON, the amount of rising current applied to the output node NO through the pull-up transistor TU may increase (i.e., an amplifier output capability may increase). For example, when a time for which the second current mirror CM2 is enabled increases by 100%, 120%, and 150%, a magnitude of an amplifier output capability may increase by TL1 (Iadd 100%), TL2 (Iadd 120%), and TL3 (Iadd 150%) in rising width. As an amplifier output capability increases, an up transition time at which the amplifier output OUTPUT is shifted to the target voltage level may be reduced, and thus, when the amount of transition between a previous data voltage and a current data voltage is relatively large, an enable time of the second current mirror CM2 may increase to shorten an up transition time.

In FIG. 7, SOE may be a source output enable signal. An on operation of the second current mirror CM2 may be performed in a high period (a horizontal blank period) of the source output enable signal SOE, and the amplifier output OUTPUT may be executed in a low period (a horizontal active period) of the source output enable signal SOE. The reason that the on operation of the second current mirror CM2 is limited to the horizontal blank period may be for preventing a transient response phenomenon of the amplifier output OUTPUT, namely, a phenomenon where the amplifier output OUTPUT is output as a voltage which is higher than the target data voltage.

Furthermore, as in FIG. 8, when the first current mirror CM1 is turned on (for example, the first switch SF is turned on) by the first control information CTR_1 indicating down transition, the high level voltage source PVDD may be coupled to the first and second control nodes Q1 and Q2, and thus, the pull-up transistor TU may be turned off and the pull-down transistor TD may be turned on. A gate on voltage of the pull-down transistor TD may be bootstrapped by the high level voltage source PVDD, as in FIG. 8, a fast sinking current may flow through the pull-down transistor TD, and thus, the amplifier output OUTPUT may sink. Comparing with a normal sinking current of when the gate on voltage of the pull-down transistor TD is not bootstrapped, as in FIG. 9, the fast sinking current may advance, by ΔT, a down transition time at which the amplifier output OUTPUT is shifted to the target voltage level TL_F, and as a result, an output slew rate of the target data voltage may be enhanced.

In this case, as in FIG. 10, when a time for which the first current mirror CM1 is enabled (i.e., a time for which the first switch SF is turned on) increases based on the second control information CTR_2 of the current mirror control information CON, the amount of sinking current sunken from the output node NO through the pull-down transistor TD may increase (i.e., an amplifier output capability may increase). For example, when a time for which the first current mirror CM1 is enabled increases by 100%, 120%, and 150%, a magnitude of an amplifier output capability may increase by TL1 (Iadd 100%), TL2 (Iadd 120%), and TL3 (Iadd 150%) in falling width. As an amplifier output capability increases, a down transition time at which the amplifier output OUTPUT is shifted to the target voltage level may be reduced, and thus, when the amount of transition between a previous data voltage and a current data voltage is relatively large, an enable time of the first current mirror CM1 may increase to shorten a down transition time.

In FIG. 10, SOE may be a source output enable signal. An on operation of the first current mirror CM1 may be performed in a high period (a horizontal blank period) of the source output enable signal SOE, and the amplifier output OUTPUT may be executed in a low period (a horizontal active period) of the source output enable signal SOE. The reason that the on operation of the first current mirror CM1 is limited to the horizontal blank period may be for preventing a transient response phenomenon of the amplifier output OUTPUT, namely, a phenomenon where the amplifier output OUTPUT is output as a voltage which is lower than the target data voltage.

Figure 11:
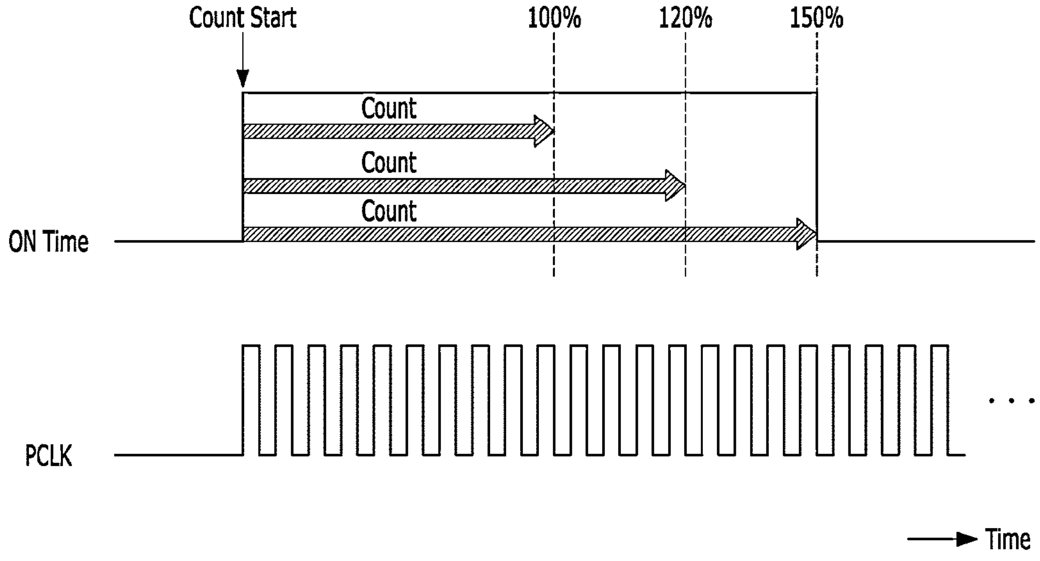
FIG. 11 is a diagram illustrating a setting example of an on operation time of each of the first current mirror and the second current mirror according to one embodiment.

FIG. 11 is a diagram illustrating a setting example of an on operation time of each of the first current mirror and the second current mirror according to one embodiment.

Referring to FIG. 11, the second control information CTR_2 of the current mirror control information CON may control an on operation time of each of the first and second current mirrors CM1 and CM2. The on operation times of the first and second current mirrors CM1 and CM2 may be divided with respect to a count time of a reference clock PCLK which is used in driving of a source driver IC. To this end, 8 to 15 PCLK count times may be allocated to an on time 100%, 16 to 23 PCLK count times may be allocated to an on time 120%, and 24 to 32 PCLK count times may be allocated to an on time 150%, but the inventive concept is not limited thereto.

Figure 12:
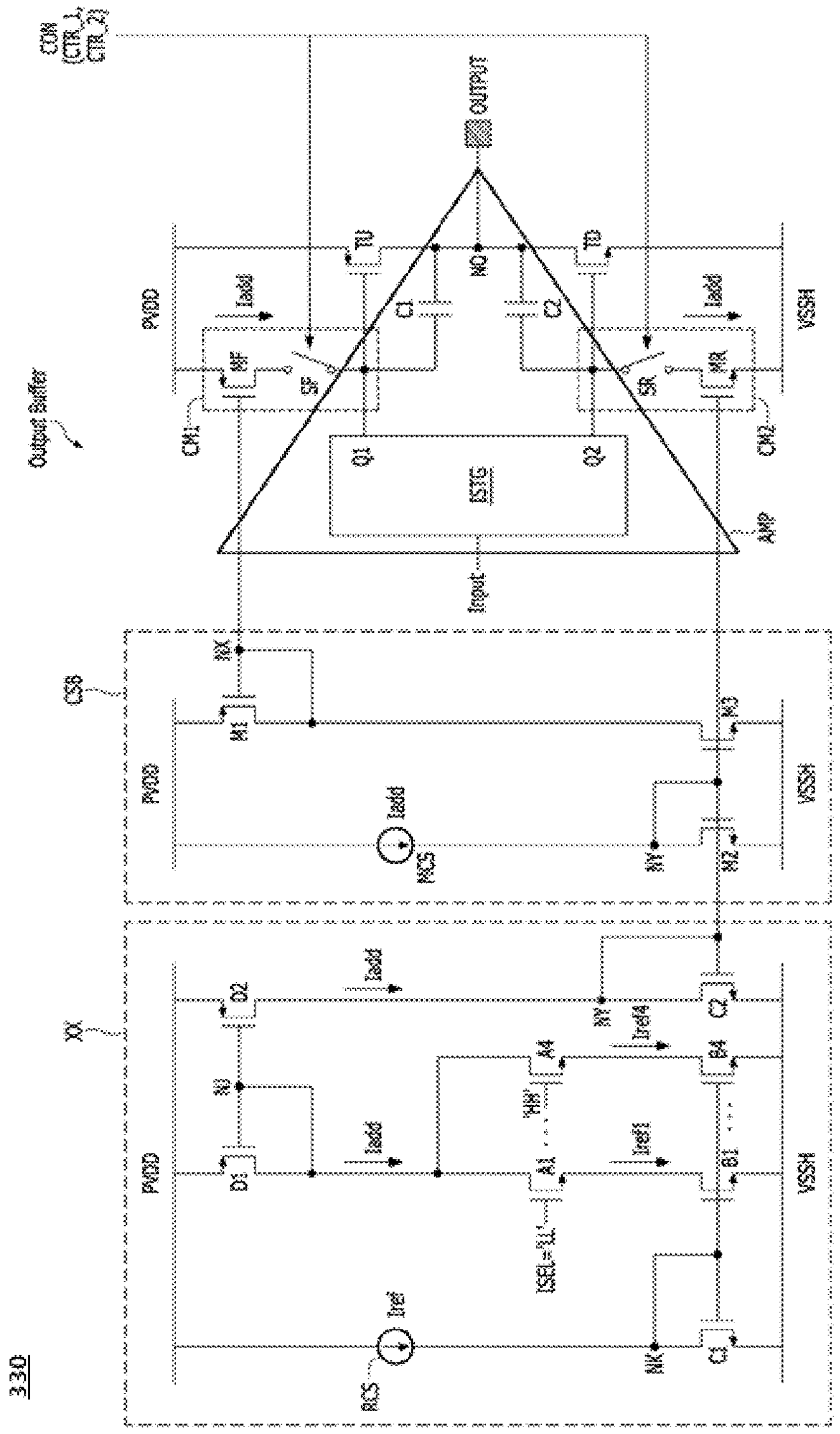
FIG. 12 is a diagram illustrating another example of an output circuit included in a source driver IC in a display apparatus according to the present embodiment.
Figures 13, 14:
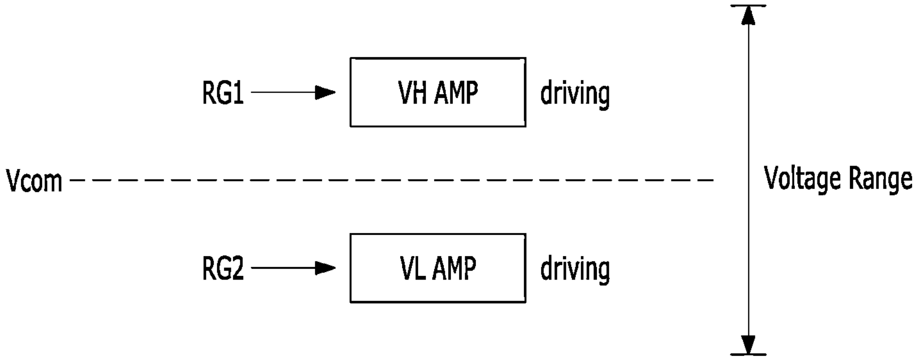
FIG. 13 is a diagram illustrating various setting examples associated with on current levels of each of the first current mirror and the second current mirror.
FIG. 14 is a diagram illustrating an example where a target data voltage included in a high voltage range is driven with a high voltage amplifier, and a target data voltage included in a low voltage range is driven with a low voltage amplifier according to one embodiment.

FIG. 12 is a diagram illustrating another example of an output circuit included in a source driver IC in a display apparatus according to one embodiment. FIG. 13 is a diagram illustrating various setting examples associated with on current levels of each of the first current mirror and the second current mirror according to one embodiment.

Referring to FIG. 12, an output circuit 330 according to the present embodiment may further include a mirroring current level setting unit XX (e.g., a circuit), and thus, may have a difference with the output circuit of FIG. 4.

The mirroring current level setting unit XX may set a level of a mirroring current Iadd, based on a current level setting signal ISEL further included in a current mirror control information CON. A level of the mirroring current Iadd may determine a response time of each of mirror transistors MF and MR, and thus, a level of the mirroring current Iadd may need to be adjusted so that an appropriate level is selected based on a model and a spec. The mirroring current level setting unit XX may be based thereon.

The mirroring current level setting unit XX may include a reference current source RCS which is connected between a high level voltage source PVDD and a low level voltage source VSSH to generate a reference current Iref and a current adjusters A1 to A4 which amplify the reference current Iref to vary a level of the mirroring current Iadd.

Channel capacities of transistors A1 to A4 configuring the current adjuster may differ, and for example, a channel capacity of a fourth transistor A4 may be greater than that of a first transistor A1.

A current level setting signal ISEL may include, for example, four logic combination values LL, LH, HL, and HH as in FIG. 13, but is not limited thereto. One of the transistors A1 to A4 may be turned on based on each of the logic combination values LL, LH, HL, and HH of the current level setting signal ISEL. Also, a current (one of Iref1 to Iref4) flowing in a transistor having an on state may be set to the mirroring current Iadd. The set mirroring current Iadd may be copied to transistors D1 and D2 configuring a current mirror and may then be transferred to a mirroring current generator CSB through a node NY.

Transistors B1 to B4, C1, and C2 undescribed with reference to FIG. 13 may be transistors needed for an operation of the mirroring current level setting unit XX.

Figure 15A:
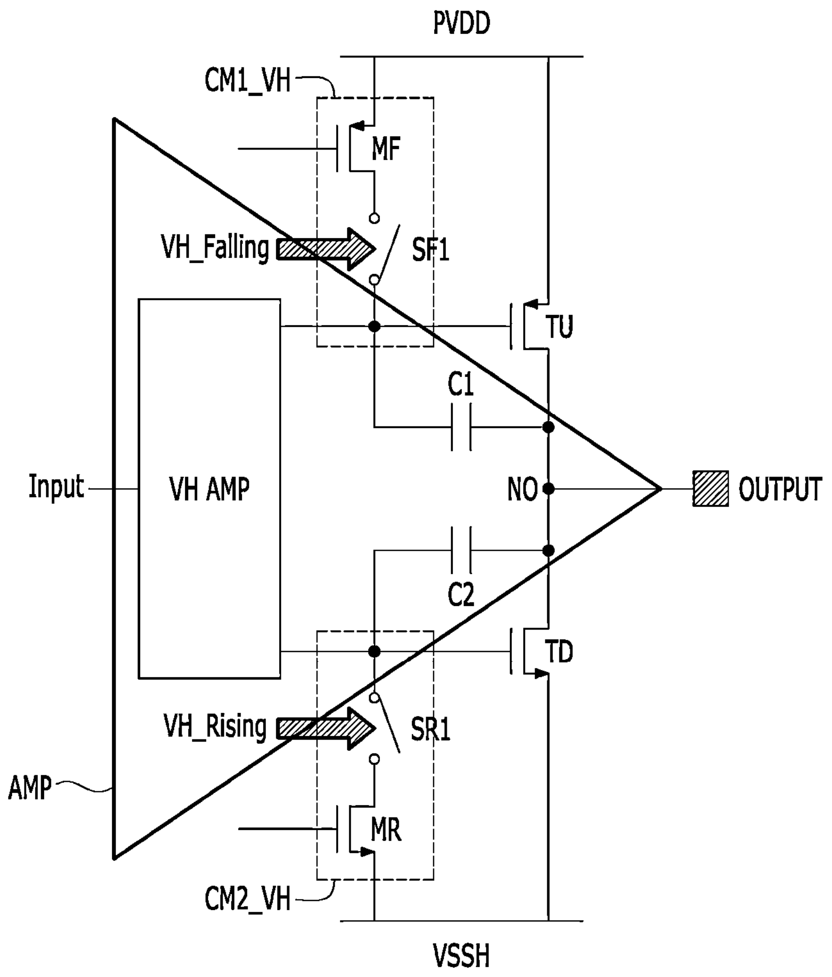
FIG. 15A is a diagram schematically illustrating a portion of an output circuit including a high voltage amplifier according to one embodiment.
Figure 15B:
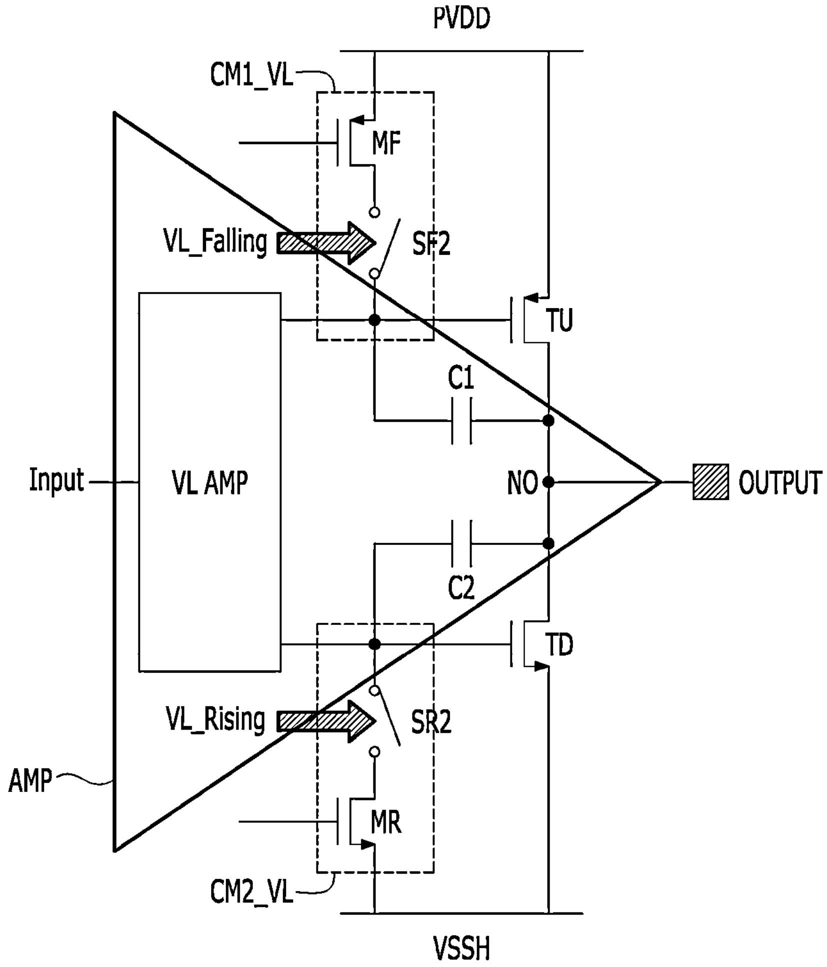
FIG. 15B is a diagram schematically illustrating a portion of an output circuit including a low voltage amplifier according to one embodiment.
Figure 16:
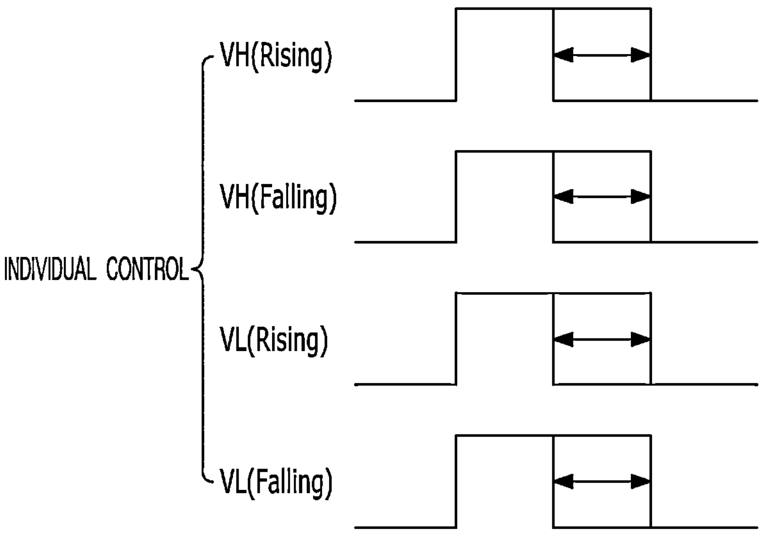
FIG. 16 is a diagram illustrating an example where an on operation time of each of first and second current mirrors included in a high voltage amplifier and an on operation time of each of first and second current mirrors included in a low voltage amplifier are individually controlled according to one embodiment.

FIG. 14 is a diagram illustrating an example where a target data voltage included in a high voltage range is driven with a high voltage amplifier, and a target data voltage included in a low voltage range is driven with a low voltage amplifier according to one embodiment. FIG. 15A is a diagram schematically illustrating a portion of an output circuit including a high voltage amplifier according to one embodiment. FIG. 15B is a diagram schematically illustrating a portion of an output circuit including a low voltage amplifier according to one embodiment. FIG. 16 is a diagram illustrating an example where an on operation time of each of first and second current mirrors included in a high voltage amplifier and an on operation time of each of first and second current mirrors included in a low voltage amplifier are individually controlled according to one embodiment.

In a liquid crystal display (LCD) apparatus, when a target data voltage is higher than a common voltage Vcom, a polarity of the target data voltage may be positive (+), and when the target data voltage is lower than the common voltage Vcom, a polarity of the target data voltage may be negative (−). In a voltage range of a data voltage, a positive (+) polarity may relatively be within a high voltage range RG1, and a negative (−) polarity may relatively be within a low voltage range RG2.

In a case where an output amplifier is implemented as a single type, as in FIG. 14, a target data voltage of the high voltage range RG1 may drive a high voltage amplifier VH AMP, and a target data voltage of the low voltage range RG2 may drive a low voltage amplifier VL AMP. This may be for securing the operation stability of the output amplifier and enhancing the efficiency of the output amplifier. In a case where the output amplifier is implemented as a rail to rail type, the high voltage amplifier VH AMP and the low voltage amplifier VL AMP may be integrated as one body.

As in FIGS. 15A and 15B, in a case where the output amplifier is implemented as a single type, the high voltage amplifier VH AMP and the low voltage amplifier VL AMP may be divided and driven.

As in FIG. 15A, a falling switch SF1 may be included in a first current mirror CM1_VH of the high voltage amplifier VH AMP, and a rising switch SR1 may be included in a second current mirror CM2_VH of the high voltage amplifier VH AMP. The first current mirror CM1_VH and the second current mirror CM2_VH of the high voltage amplifier VH AMP may be selectively turned on by the first control information CTR_1 described above. On operation times of the first current mirror CM1_VH and the second current mirror CM2_VH of the high voltage amplifier VH AMP may be individually controlled by the second control information CTR_2 described above as in FIG. 16.

As in FIG. 15B, a falling switch SF2 may be included in a first current mirror CM1_VL of the low voltage amplifier VL AMP, and a rising switch SR2 may be included in a second current mirror CM2_VL of the low voltage amplifier VL AMP. The first current mirror CM1_VL and the second current mirror CM2_VL of the low voltage amplifier VL AMP may be selectively turned on by the first control information CTR_1 described above. On operation times of the first current mirror CM1_VL and the second current mirror CM2_VL of the low voltage amplifier VL AMP may be individually controlled by the second control information CTR_2 described above as in FIG. 16.

Figure 17:
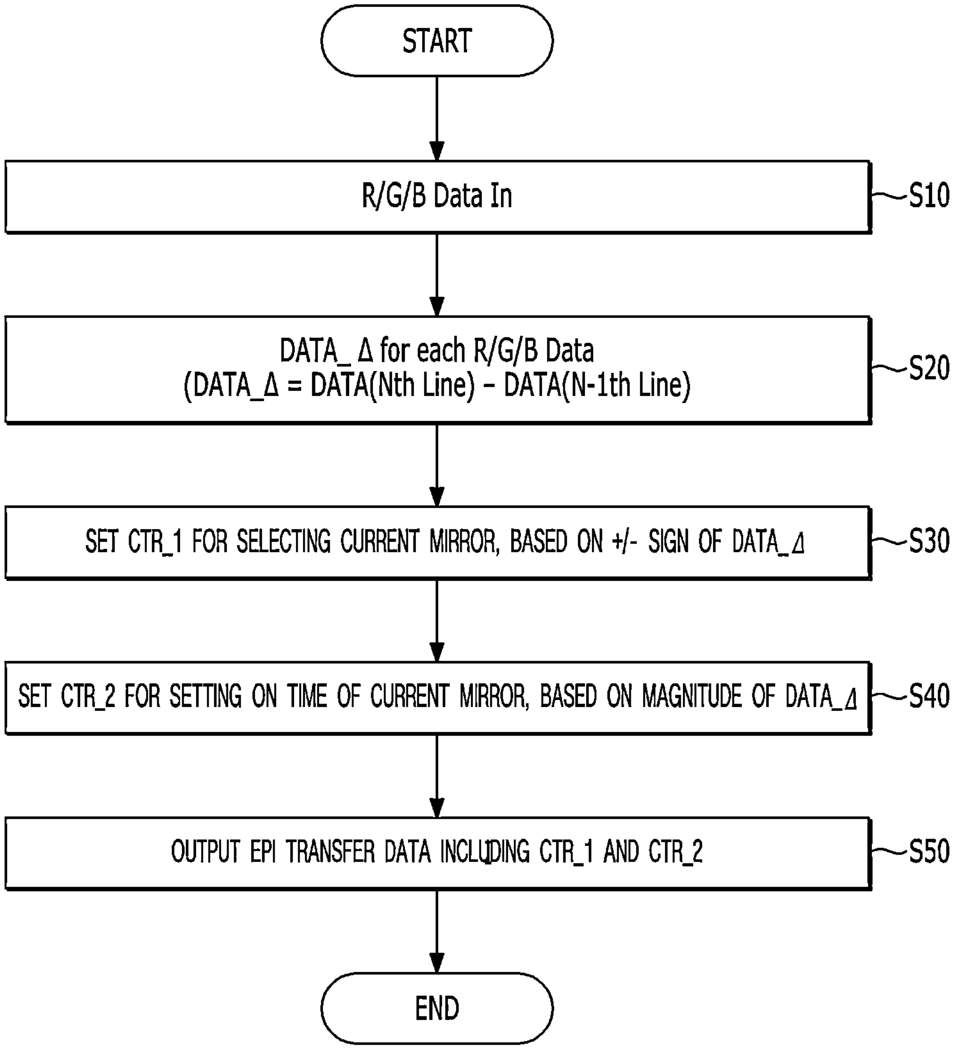
FIG. 17 is a diagram illustrating an operation of a timing controller which sets current mirror control information to output in an embedded panel interface (EPI) format, based on the degree of transition of a data voltage according to one embodiment.

FIG. 17 is a diagram illustrating an operation of a timing controller which sets current mirror control information to output in an embedded panel interface (EPI) format, based on the degree of transition of a data voltage.

Referring to FIG. 17, when red (R), green (G), and blue (B) image data are input (S10), a timing controller may compare $N^{th}-1$ (where N may be a natural number) line image data with $N^{th}$ line image data for each of R, G, and B subpixels of each output channel to calculate the amount of data transition "DATA_Δ" of each of R, G, and B subpixels (S20).

The timing controller may set first control information CTR_1 for selecting a first current mirror or a second current mirror of an output amplifier, based on a positive (+) sign or a negative (−) sign of the amount of data transition "DATA_Δ" (S30). When the amount of data transition "DATA_Δ" is positive (+) (DATA_Δ>0), the timing controller may determine a transition direction of output data of a corresponding subpixel as a rising direction, and when the amount of data transition "DATA_Δ" is negative (−) (DATA_Δ<0), the timing controller may determine the transition direction of the output data of the corresponding subpixel as a falling direction. Accordingly, the timing controller may set the first control information CTR_1 which denotes the transition direction of the output data, and the first control information CTR_1 may be decoded by a source driver IC and may thus be a criterion for selecting a first current mirror or a second current mirror of an output amplifier.

When the transition direction of the output data is determined, the timing controller may set second current control information CTR_2 which determines an on time of a first current mirror or a second current mirror, based on a magnitude of the amount of data transition "DATA_Δ" (S40). The timing controller may set the on time to increase as the amount of data transition "DATA_Δ" increases, thereby enhancing a charging/discharging characteristic. Accordingly, the timing controller may set second current control information CTR_2 so that an on time of a current mirror is set based on the amount of data transition "DATA_Δ", and when the amount of data transition "DATA_Δ" is less than or equal to a threshold value, the timing controller may set second current control information CTR_2 so that a corresponding current mirror is disabled.

The timing controller may format current mirror control information CON, including the first current control information CTR_1 and the second current control information CTR_2 about subpixel-based RGB data, into EPI transfer data and may transfer the EPI transfer data to a source driver IC (S50).

Figures 18, 19:
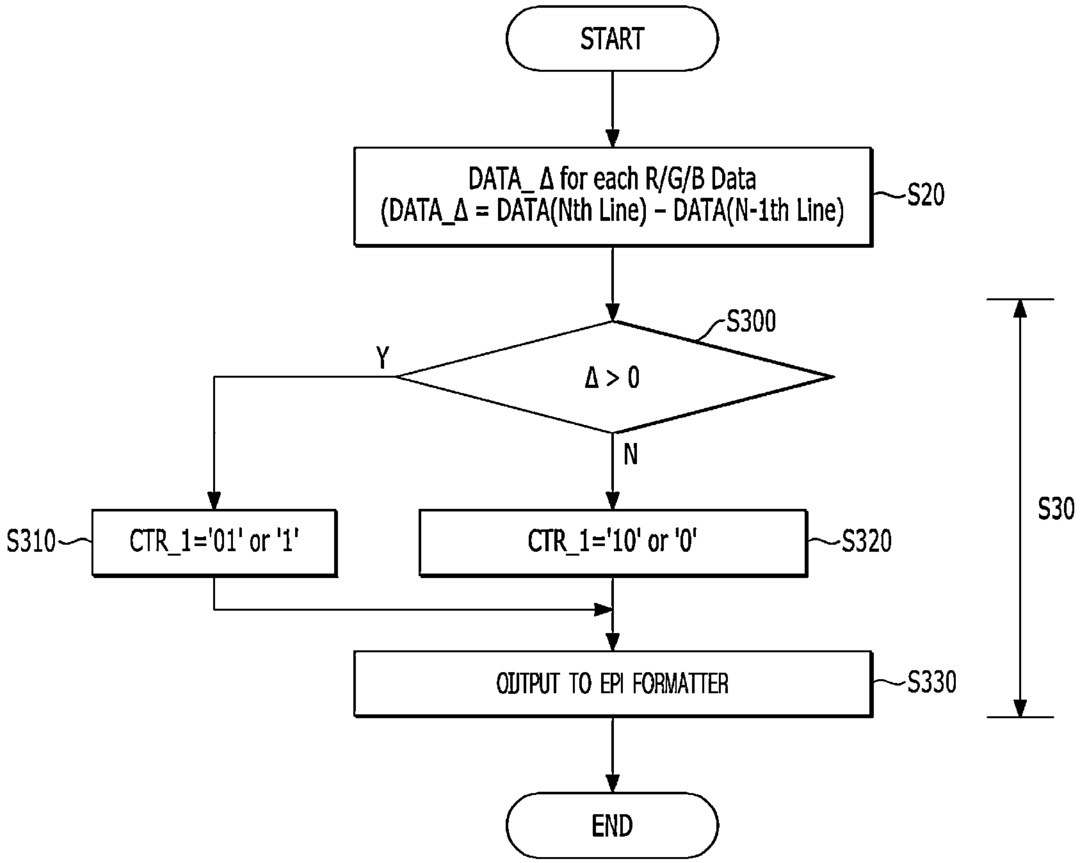
FIGS. 18 and 19 are diagrams illustrating in more detail a current mirror selection step of FIG. 17 according to one embodiment.

FIG. 18 is a diagram illustrating in more detail S30 of FIG. 17 according to one embodiment.

Referring to FIG. 18, the timing controller may calculate the amount of RGB subpixel-based data transition "DATA_Δ" of the $N^{th}-1$ (where N may be a natural number) line image data and the $N^{th}$ line image data (S20), and then, may determine a positive (+) or negative (−) sign of the amount of data transition "DATA_Δ" (S300).

When the amount of data transition "DATA_Δ" is positive (+) (DATA_Δ>0), the timing controller may set the first control information CTR_1 to '01' or '1' (S310).

When the amount of data transition "DATA_Δ" is negative (−) (DATA_Δ<0), the timing controller may set the first control information CTR_1 to '10' or '0' (S320).

The timing controller may output the first control information CTR_1 to an EPI formatter to reflect in the EPI transfer data (S330).

FIG. 19 is a diagram illustrating a selection operation of a current mirror based on first control information according to one embodiment.

Referring to FIG. 19, the first control information CTR_1 transferred as '01' or '1' through the EPI transfer data may be decoded in the source driver IC and may be a criterion for selecting the second current mirror CM2 (CM2 may be ON, and CM1 may be OFF). Also, the first control information CTR_1 transferred as '10' or '0' through the EPI transfer data may be decoded in the source driver IC and may be a criterion for selecting the first current mirror CM1 (CM1 may be ON, and CM2 may be OFF).

Figure 20:
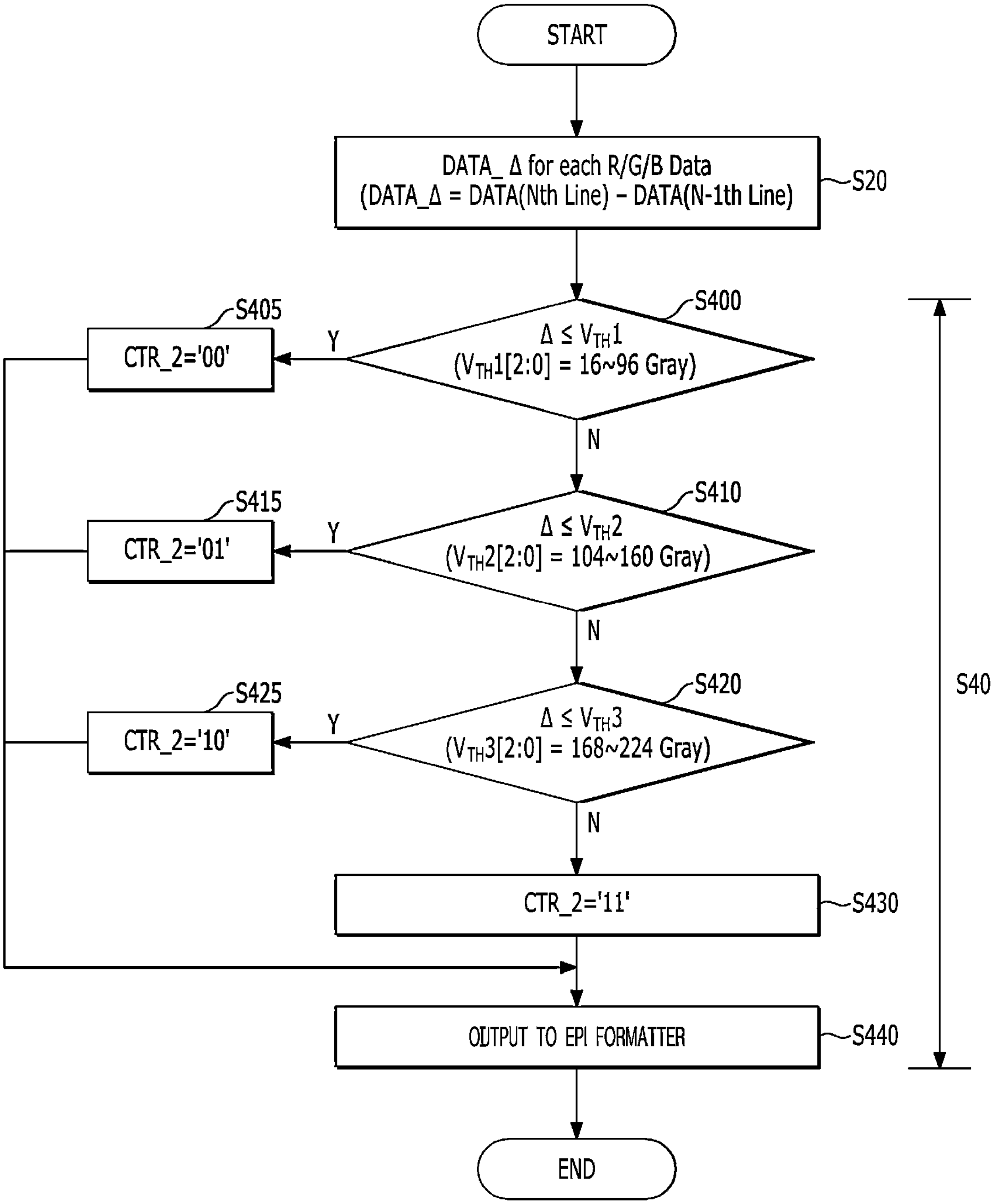
FIGS. 20 and 21 are diagrams illustrating in more detail an on time determination step of a current mirror of FIG. 17 according to one embodiment.

FIG. 20 is a diagram illustrating in more detail S40 of FIG. 17 according to one embodiment.

Referring to FIG. 20, the timing controller may set the second control information CTR_2 indicating an on time of a current mirror, based on the amount of data transition "DATA_Δ" (S40). The second control information CTR_2 based on the amount of data transition "DATA_Δ" may be stored in an internal memory of the timing controller, or may be provided as a type stored in an external memory. The amount of data transition "DATA_Δ" divided into a plurality of sections and a logic value (a bit value) mapped to each section may be stored in a memory for setting the second control information CTR_2. In FIG. 20, a case is illustrated where the amount of data transition "DATA_Δ" is divided into four sections with respect to first to third reference values VTH1 to VTH3 and each of the sections is represented by a 2-bit logic value, but the present embodiment is not limited thereto.

Referring to FIG. 20, the timing controller may calculate the amount of RGB subpixel-based data transition "DATA_Δ" of the $N^{th}-1$ (where N may be a natural number) line image data and the $N^{th}$ line image data (S20), and then, may determine an on time of a current mirror, based on a magnitude of the amount of data transition "DATA_Δ" (S400 to S420).

The timing controller may determine whether the amount of data transition "DATA_Δ" is less than or equal to the first reference value VTH1 (S400). The first reference value VTH1 may be a grayscale value represented by 3 bits and may be set within a grayscale range of 16 to 96.

When the amount of data transition "DATA_Δ" is less than or equal to the first reference value VTH1 (DATA_Δ_≤VTH1), the timing controller may set the second control information CTR_2 to '00' (CTR_2=00) (S405).

When the amount of data transition "DATA_Δ" is greater than the first reference value VTH1, the timing controller may determine whether the amount of data transition "DATA_Δ" is less than or equal to the second reference value VTH2 (S410). The second reference value VTH2 may be a grayscale value represented by 3 bits and may be set within a grayscale range of 104 to 160.

When the amount of data transition "DATA_Δ" is less than or equal to the second reference value VTH2 (VTH1<DATA_Δ_VTH2), the timing controller may set the second control information CTR_2 to '01' (CTR_2=01) (S415).

When the amount of data transition "DATA_Δ" is greater than the second reference value VTH2, the timing controller may determine whether the amount of data transition "DATA_Δ" is less than or equal to the third reference value VTH3 (S420). The third reference value VTH3 may be a grayscale value represented by 3 bits and may be set within a grayscale range of 168 to 224.

When the amount of data transition "DATA_Δ" is less than or equal to the third reference value VTH3 (VTH2<DATA_Δ<VTH3), the timing controller may set the second control information CTR_2 to '10' (CTR_2=10) (S425).

When the amount of data transition "DATA_Δ" is greater than the third reference value VTH3, the timing controller may set the second control information CTR_2 to '11' (CTR_2=11) (S430).

The timing controller may output the second control information CTR_2 to the EPI formatter to reflect in the EPI transfer data (S440).

Figures 21, 22:
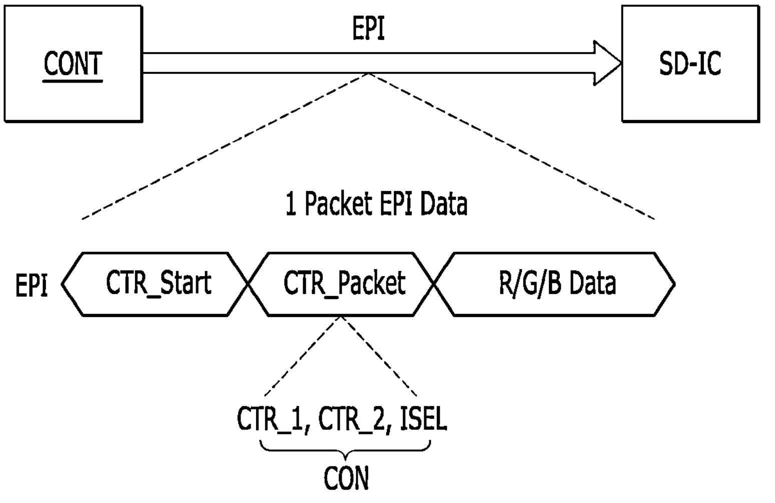
FIG. 22 is a diagram illustrating an EPI transfer data format including current mirror control information according to one embodiment.

FIG. 21 is a diagram illustrating an on time setting operation of a current mirror based on second control information according to one embodiment.

Referring to FIG. 21, second control information CTR_2 transferred as '00' through EPI transfer data may be decoded in a source driver IC and may be a criterion for turning off a current mirror.

Moreover, the second control information CTR_2 transferred as '01' through the EPI transfer data may be decoded in the source driver IC and may be a criterion for setting an on time of the current mirror to 100%.

Moreover, the second control information CTR_2 transferred as '10' through the EPI transfer data may be decoded in the source driver IC and may be a criterion for setting the on time of the current mirror to 120%.

Moreover, the second control information CTR_2 transferred as '11' through the EPI transfer data may be decoded in the source driver IC and may be a criterion for setting the on time of the current mirror to 150%.

FIG. 22 is a diagram illustrating an EPI transfer data format including current mirror control information according to one embodiment.

Referring to FIG. 22, a timing controller CONT may format current mirror control information CON, including first current control information CTR_1, second current control information CTR_2, and a current level setting signal ISEL described above, into EPI transfer data and may then transfer the EPI transfer data to a source driver IC SD-IC. One packet EPI transfer data may include a control start region, a control packet region, and an R/G/B data region, and the current mirror control information CON may be encoded into the control packet region.

Figure 23:
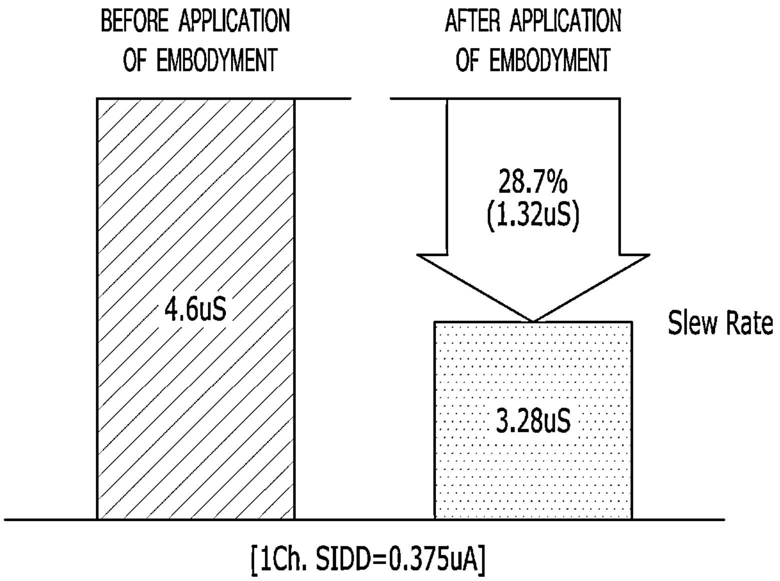
FIG. 23 is a diagram illustrating an effect where an output slew rate is enhanced according to an application of the present embodiment.
Figure 24:
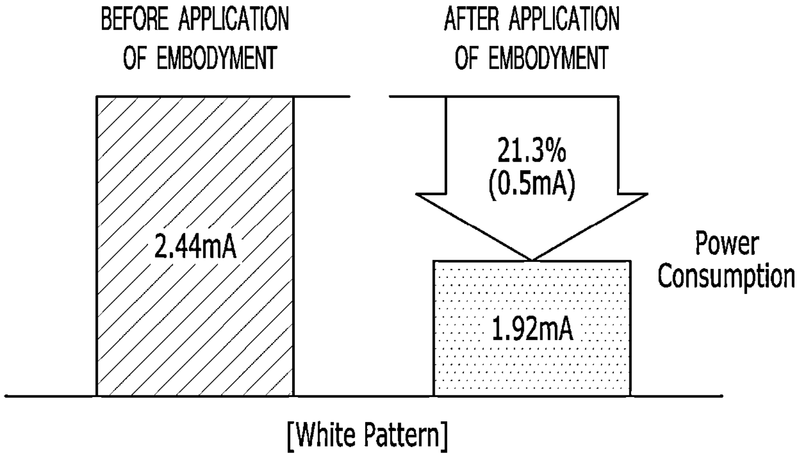
FIG. 24 is a diagram illustrating an effect where power consumption is enhanced according to an application of the present embodiment.

FIG. 23 is a diagram illustrating an effect where an output slew rate is enhanced according to an application of an embodiment. FIG. 24 is a diagram illustrating an effect where power consumption is enhanced according to an application of an embodiment.

Referring to FIG. 23, in one embodiment, a falling current mirror (the first current mirror described above) and a rising current mirror (the second current mirror described above) which allow a mirroring current having the same level to flow may be included in an amplifier circuit, a current mirror may be selectively turned on based on a sign of data transition, and an on time of the current mirror may be controlled based on a magnitude of data transition, whereby an output slew rate of the amplifier circuit outputting a target data voltage may increase by about 28.7% compared to a conventional amplifier circuit.

Referring to FIG. 24, in one embodiment, an output slew rate may be sufficiently enhanced even without increasing a main bias current, and thus, consumption power may increase by about 21.3% compared to a conventional amplifier circuit.

The present embodiment may realize the following effects.

In the present embodiment, a current mirror of an amplifier circuit may be selectively enabled on an output channel where the degree of data transition is large, and thus, a data charging/discharging speed of the amplifier circuit may increase even without an increase in power consumption.

In the present embodiment, a rising current mirror or a falling current mirror may be selectively enabled in a direction of pixel-based data transition, and an enable time of a current mirror may be adjusted based on a magnitude of data transition, thereby more enhancing a data charging/discharging speed of the amplifier circuit.

In the present embodiment, the same mirroring current may be applied to a first current mirror and a second current mirror in a mirroring current generator, thereby preventing an output asymmetric problem between a rising output and a falling output occurring when enhancing an output slew rate of the amplifier circuit.

In the present embodiment, because a timing controller may transfer current mirror control information to a source driver IC by using an EPI protocol, a separate transfer line for transferring the current mirror control information may be omitted.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a display panel including a plurality of pixels;

a timing controller configured to generate current mirror control information based on an amount of transition of image data to be written in the plurality of pixels; and an output circuit configured to output a target data voltage that corresponds to the image data to a data output channel connected to one of the plurality of pixels, wherein the output circuit comprises:

a mirroring current generator circuit configured to generate a mirroring current; and an amplifier circuit including a pull-up transistor connected between a high level voltage source and an output node and including a first gate electrode, a first capacitor connected between the first gate electrode and the output node, a first current mirror configured to directly supply the mirroring current to the first gate electrode according to the current mirror control information, a pull-down transistor connected between a low level voltage source and the output node and including a second gate electrode, a second capacitor connected between the second gate electrode and the output node, and a second current mirror configured to directly supply the mirroring current to the second gate electrode according to the current mirror control information.

2. The display apparatus of claim 1, wherein the first current mirror comprises a first mirror transistor and a first switch that are serially connected between the high level voltage source and the first gate electrode, and the second current mirror comprises a second mirror transistor and a second switch that are serially connected between the low level voltage source and the second gate electrode.

3. The display apparatus of claim 2, wherein each of the first mirror transistor and the pull-up transistor is a P-type transistor, and each of the second mirror transistor and the pull-down transistor is a N-type transistor.

4. The display apparatus of claim 2, wherein, responsive to a condition where the amount of transition of the image data is a positive sign, the pull-down transistor and the first current mirror are turned off, and the pull-up transistor and the second current mirror are turned on, and an amount of rising current applied to the output node through the pull-up transistor increases in proportion to an on time of the second current mirror.

5. The display apparatus of claim 2, wherein, responsive to a condition where the amount of transition of the image data is a negative sign, the pull-up transistor and the second current mirror are turned off, and the pull-down transistor and the first current mirror are turned on, and an amount of sinking current applied to the output node through the pull-down transistor increases in proportion to an on time of the first current mirror.

6. The display apparatus of claim 2, wherein the first current mirror and the second current mirror are selectively turned on responsive to a first condition where the amount of transition of the image data is greater than a threshold value, and all of the first current mirror and the second current mirror are turned off responsive to a second condition where the amount of transition of the image data is less than or equal to the threshold value.

7. The display apparatus of claim 6, wherein, responsive to the first condition, an on time of the first current mirror or an on time of the second current mirror increases in proportion to the amount of transition of the image data.

8. The display apparatus of claim 2, wherein the current mirror control information comprises first control information that selectively turns on the first current mirror and the second current mirror, based on a positive or negative sign of the amount of transition of the image data, and second control information that sets an on time of the first current mirror or an on time of the second current mirror, based on a magnitude of the amount of transition of the image data.

9. The display apparatus of claim 8, wherein the first current mirror and the second current mirror are selectively turned on based on the first control information and maintain an on state for an on time set based on the second control information.

10. The display apparatus of claim 1, wherein the output circuit further comprises a mirroring current level setting circuit configured to set a level of the mirroring current, based on the current mirror control information.

11. The display apparatus of claim 1, further comprises:

a source driver integrated circuit with the output circuit mounted thereon, wherein the timing controller adds the current mirror control information to a control packet region of an embedded panel interface (EPI) transfer data format to transfer to the source driver integrated circuit.

12. The display apparatus of claim 1, wherein the mirroring current generator circuit is configured to supply a same mirroring current to the first current mirror and the second current mirror.

* * * * *